United States Patent
Ohtake et al.

(10) Patent No.: US 6,512,560 B2
(45) Date of Patent: Jan. 28, 2003

(54) HALF-TRANSMISSIVE LIQUID CRYSTAL DISPLAY ELEMENT

(75) Inventors: Toshiya Ohtake, Fukaya (JP); Yuzo Hisatake, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 51 days.

(21) Appl. No.: 09/860,554

(22) Filed: May 21, 2001

(65) Prior Publication Data

US 2001/0046014 A1 Nov. 29, 2001

(30) Foreign Application Priority Data

May 24, 2000 (JP) ........................................ 2000-153508

(51) Int. Cl.$^7$ ............................................. G02F 1/1335
(52) U.S. Cl. ........................... 349/114; 349/96; 349/61; 349/106; 349/113
(58) Field of Search .......................... 349/61, 96, 98, 349/113, 114, 106

(56) References Cited

U.S. PATENT DOCUMENTS

| | | | |
|---|---|---|---|
| 5,764,322 A | * 6/1998 | Mamiya et al. | 349/113 |
| 6,147,937 A | * 11/2000 | Arikawa et al. | 349/113 |
| 6,185,161 B1 | * 2/2001 | Arikawa et al. | 349/106 |
| RE37,377 E | * 9/2001 | Gunjima et al. | 349/113 |
| 6,385,139 B1 | * 5/2002 | Arikawa et al. | 349/104 |
| 6,437,840 B1 | * 8/2002 | Arikawa et al. | 349/62 |

* cited by examiner

*Primary Examiner*—William L. Sikes
*Assistant Examiner*—Tarifur R. Chowdhury
(74) *Attorney, Agent, or Firm*—Pillsbury Winthrop LLP

(57) ABSTRACT

The liquid crystal display element includes a polarization plate, a liquid crystal layer provided in the rear of the polarization plate, for modulating incident light in correspondence with an applied voltage, a selectively reflective layer provided behind the liquid crystal layer, for reflecting a first circular polarization component of incident light, and a back light source arranged in the rear of the selectively reflective layer, for emitting light having intensity peaks for a plurality of predetermined wavelengths. The selectively reflective layer has first reflection factors to the first polarization components of incident light falling within first small regions of visible light, including the plurality of predetermined wavelengths, and has second reflection factors to the first polarization components of incident light falling within second small regions of visible light, not including the plurality of predetermined wavelengths. The first reflection factors are smaller than the second reflection factors.

8 Claims, 5 Drawing Sheets

HALF-TRANSMISSIVE LIQUID CRYSTAL DISPLAY ELEMENT

CROSS-REFERENCE TO RELATED APPLICATIONS

This application is based upon and claims the benefit of priority from the prior Japanese Patent Application No. 2000-153508, filed May 24, 2000, the entire contents of which are incorporated herein by reference.

BACKGROUND OF THE INVENTION

The present invention relates to a half-transmissive liquid crystal display element.

Conventionally, for example, a reflective liquid crystal display element is designed to utilize external light for display. In some use environments, therefore, illumination is insufficient so short that its display screen is dark. It thus cannot be used at all in a dark place.

Meanwhile, developments have been made for a half-transmissive liquid crystal display element which uses a half-transmissive reflection plate (half-mirror) as a reflection plate for reflecting external light and a back light is provided on the back surface of this half-transmissive reflection plate, so that the element can be used as a reflective liquid crystal display element in a bright environment and as a transmissive liquid crystal display element in a dark environment. However, the half-transmissive reflection plate utilizes incident light at an efficiency of 50% at most, and therefore, the brightness of the display screen is far lower than a transmissive liquid crystal display element or a reflective liquid crystal display element.

In recent years, in response to the problems described above, a half-transmissive liquid crystal display element is studied such that a pinhole is formed in the reflective layer for each pixel and a micro-lens is provided for each pixel. In this liquid crystal display element, the efficiency of use of light is raised by using external light reflected at the area of a reflection plate excluding the pinholes, as a light source when using external light, and by using light which passes through the pinholes and is collected by the micro-lens.

In this kind of liquid crystal display element, however, the brightness of its display screen is lowered only by a margin corresponding to the pinhole when using external light. As a result, the frequency of use as a transmissive liquid crystal display element using the back light is increased so that the power consumption increases. In addition, the reflection plate comprising pinholes has a complicated structure and must therefore be constructed as a reflection plate externally attached to a liquid crystal panel. As a result, a parallax is caused which considerably deteriorates the display performance.

Meanwhile, discussion has also been made on a display element of a so-called front-light type in which a light guide plate is provided on the observation surface side of a reflective liquid crystal display element and a linear light source is provided on the side surface of this light guide plate. However, in this display element, a surface reflection at the front surface of the display element is large so that the image quality such as contrast is greatly lowered.

BRIEF SUMMARY OF THE INVENTION

The present invention has been made in view of the circumstances described above and its object is to provide a half-transmissive liquid crystal display element in which the light use efficiency is greatly improved so that excellent display can be realized over a wide view angle range.

To achieve the above object, a half-transmissive liquid crystal display element according to the present invention comprises: a polarization plate having a polarization axis, for transmitting linearly polarized light along the polarization axis;

a light modulation layer arranged behind the polarization plate, for modulating incident light having first and second circular polarization components, in correspondence with an applied voltage;

a selectively reflective layer arranged behind the light modulation layer, for reflecting the first circular polarization component of incident light; and a back light source arranged behind the selectively reflective layer, for emitting light having intensity peaks at a plurality of predetermined wavelengths, respectively, toward the selectively reflective layer, wherein the selectively reflective layer has first reflection factors to the first polarization components of incident light falling within first small regions of visible light, including the plurality of predetermined wavelengths, and has second reflection factors to the first polarization components of incident light falling within second small regions of visible light, not including the plurality of predetermined wavelengths, the first reflection factors being set to be smaller than the second reflection factors.

In the liquid crystal display element according to the present invention, the first reflection factors are set to be 30 to 70% of the second reflection factors.

Further, in the liquid crystal display element according to the present invention, in at least one group of the first and second reflection factors, the reflection factors are not constant.

According to the liquid crystal display element constructed as described above, the selectively reflective layer transmits light from the back light source to use it mainly for display, within a wavelength range in which the intensity of light from the back light source is high. Within a wavelength range in which the intensity of the light of the back light source is low, the selectively reflective layer reflects light, which is taken in from outside into the element, to use the light mainly for display. Therefore, the light of the back light source and the external light can be efficiently used.

Also, in the liquid crystal display element according of the present invention, at least one of the first small regions has a center wavelength longer than a corresponding one of the predetermined wavelengths.

Also, in the liquid crystal display element according to the present invention, the center wavelength of the at least one of the first small regions is longer by 0 to 40 nm than the corresponding one of the predetermined wavelengths. Further, in the liquid crystal display element according to the present invention, each of the first small regions has a band width of 30 nm to 80 nm.

In at least one of the first small regions, a minimum value of the reflection factor to the first circular polarization component is equal to or longer than the corresponding one of the predetermined wavelengths.

According to the liquid crystal display element constructed as described above, sufficient use efficiency of light can be maintained if a selected reflection wavelength shifts to the side of a shorter wavelength when the liquid crystal display element is observed obliquely. It is thus possible to attain display characteristics in which visual changes in colors and brightness are reduced.

Another liquid crystal display element according to the present invention comprises: a polarization plate having a polarization axis, for transmitting linearly polarized light along the polarization axis;

a light modulation layer arranged behind the polarization plate, for modulating incident light having first and second circular polarization components, in correspondence with an applied voltage;

a selectively reflective layer arranged behind the light modulation layer, for reflecting the first circular polarization component of incident light; and a back light source arranged behind the selectively reflective layer, for emitting light having intensity peaks at a plurality of predetermined wavelengths, respectively, toward the selectively reflective layer; and a color filter layer provided in front of the selectively reflective layer, wherein the selectively reflective layer has first reflection factors to the first polarization components of incident light falling within first small regions of visible light, including the plurality of predetermined wavelengths, and has second reflection factors to the first polarization components of incident light falling within second small regions of visible light, not including the plurality of predetermined wavelengths, the first reflection factors being set to be smaller than the second reflection factors, and the color filter layer has spectral transmission factors to incident light, the spectral transmission factor to incident light falling within at least one of the first small regions being set to be smaller than the spectral transmission factor to incident light falling within the second small regions.

According to the liquid crystal display element constructed as described above, color densities of the color filter layer can be individually set for a wavelength range which is used mainly for reflection and for a wavelength range which is used mainly for transmission, respectively. Display with a wider color reproduction range can thus be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
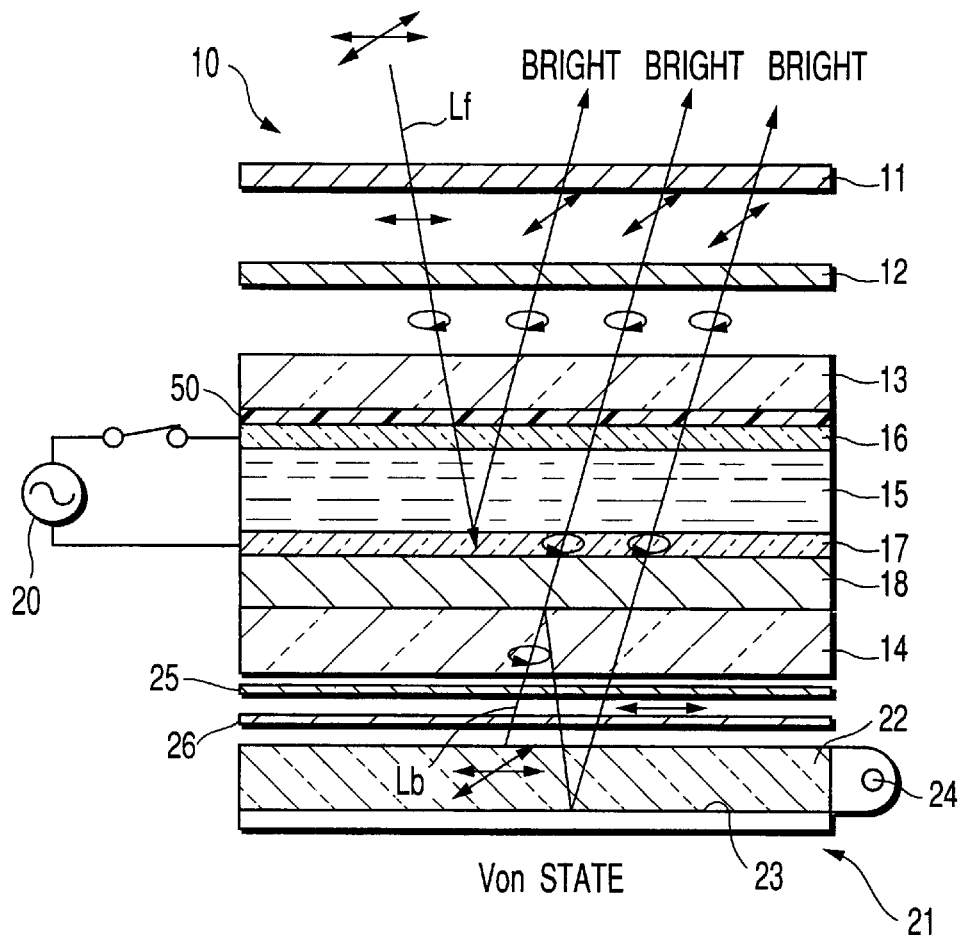
FIG. 1 is a view schematically showing a liquid crystal display element according to the first embodiment of the present invention, in a state wherein a first voltage from a power source is applied to the liquid crystal of the element.

With reference to the drawings, a detailed explanation will now be made of a half-transmissive liquid crystal display element according to an embodiment of the present invention. At first, the basic structure of the liquid crystal display element will be explained.

As shown in FIGS. 1 to 4, the liquid crystal display element comprises a liquid crystal element in which a liquid crystal layer 15 of a vertical orientation type which functions as a light-phase modulation layer is clamped between two glass substrates 13 and 14 opposing to each other. A $\lambda/2$ phase-difference layer 12 and a polarization plate 11 are provided in this order on the observation side of the display element, i.e., on the outer surface of the glass substrate 13. Opposed to the outer surface of the other glass substrate 14, $\lambda/4$ phase-difference layer 25, a polarization plate 26, and a back light source 21 are provided in this order.

A color filter layer 50 is arranged on the inner surface side of the glass substrate 13 which functions as an array substrate, and a large number of pixel electrodes 16 formed of transparent ITO are provided in the form of a matrix on the color filter layer from. On the inner surface side of the glass substrate 14 are provided a cholesteric liquid crystal layer 18, which is made of polymerized cholesteric liquid crystal and functions as a selectively reflective layer, and an opposite electrode 17.

The phase difference plate 12 and the liquid crystal layer 15 respectively function as fixed and variable retarder layers, which construct a variable retarder.

Figure 2:
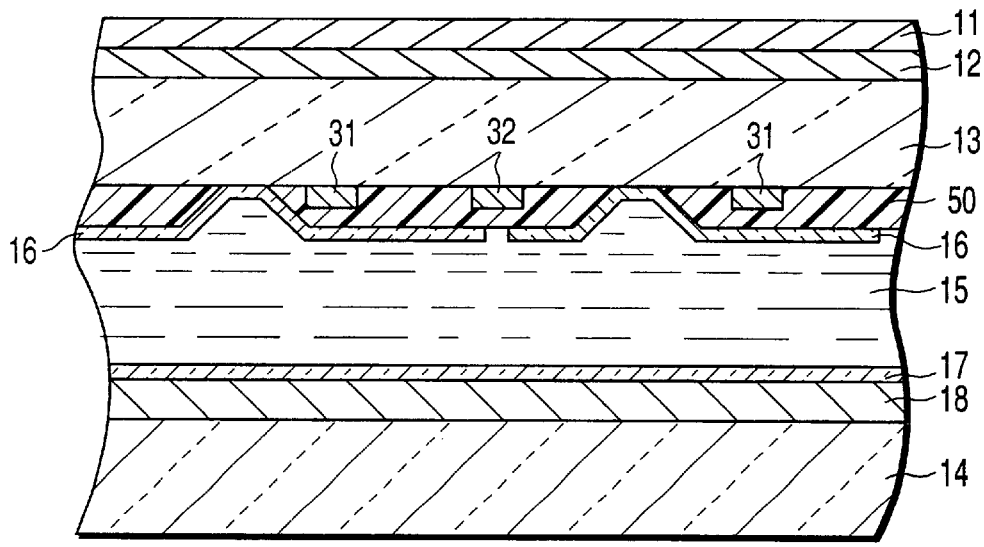
FIG. 2 is a cross-sectional view of the liquid crystal display element.
Figure 3:
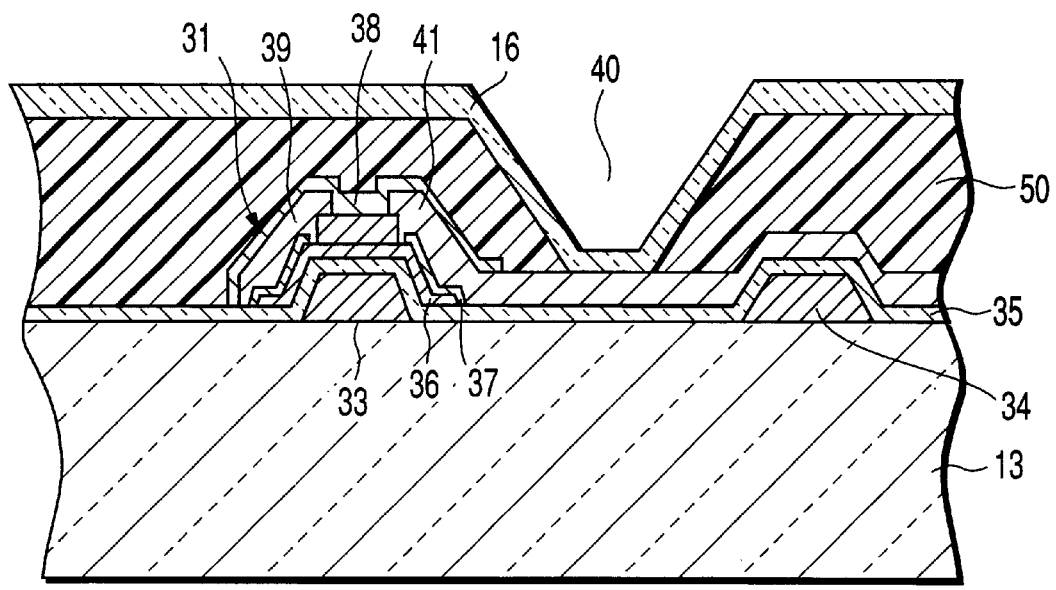
FIG. 3 is an enlarged view of an array substrate of the liquid crystal display element.
Figure 4:
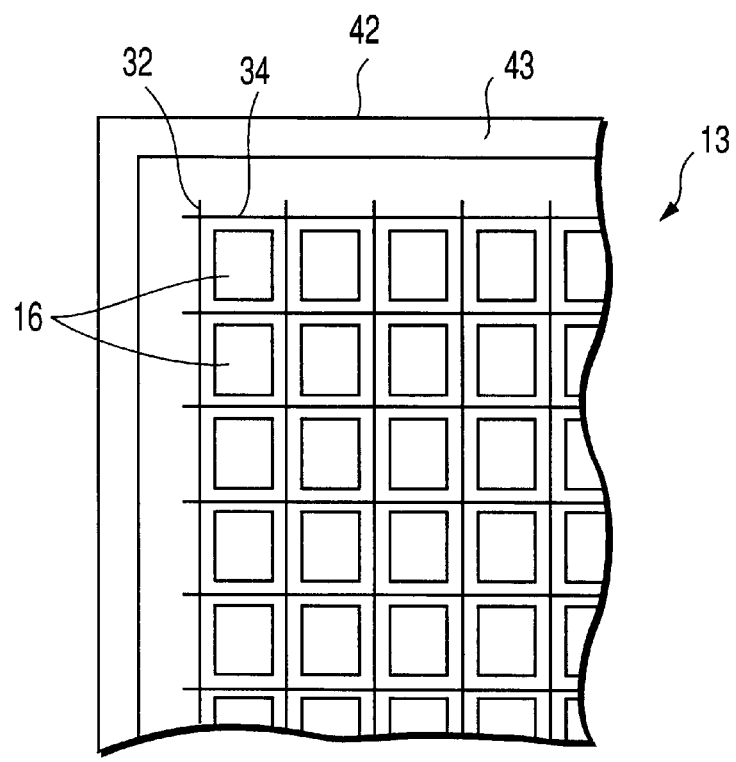
FIG. 4 is a plan view schematically showing the array substrate.

As can be seen from FIGS. 2 and 3, signal lines 32 and scan lines 34 including gate electrodes 33 are arranged in the form of a matrix on the glass substrate 13. Further, an auxiliary capacity electrode, not shown, is provided upon necessity. Thin film transistors 31 (hereinafter called TFTS) as switching elements are provided respectively at near cross parts where the signal line 32 and the scan line 34 cross each other, and are also respectively connected with pixel electrodes 16. An oxide film 35 is formed, overlapped on the signal lines 32 and the scan lines 34.

Each TFT 31 comprises a semiconductor film 36 made of amorphous silicon (a-Si) and provided on the gate electrode 33 with an oxide film 35 interposed therebetween, and a source electrode 41 and a drain electrode 39 provided on the semiconductor film 36 with a low-resistance semiconductor film 37 inserted therebetween. Each TFT 31 is covered with a passivation film 38.

In the TFT having a bottom gate structure in which the gate electrode 33 is arranged below the semiconductor film 36, external light which enters from the array substrate 13 toward the TFT 31 is shielded by the gate electrode 33 and does not enter into the semiconductor film 36. As a result, it is possible to prevent deterioration of the contrast ratio due to a light leakage current caused by light when a display apparatus is used outdoors.

Each pixel electrode 16 is connected to the source electrode 41 through a contact hole of about 19 μm square formed in a color filter layer 50. The color filter layer 50 is provided over the entire surface of the pixel part. This color filter layer 50 is constructed by color layers of three primary colors or complementary three primary colors of yellow, cyan, and magenta. Electric-field control is performed on the liquid crystal layer 15 in units of pixels by the pixel electrodes 30 arranged in the form of a matrix and the opposite electrode 17, thereby to achieve color display according to an additive mixture of color stimuli.

At the boundary between the pixel electrodes 16, either the signal line 32, scan line 34, or auxiliary capacity line is provided, so that light from the back light source 21 is prevented from leaking and lowering the contrast ratio when transmitted light from the back light source 21 is used.

Meanwhile, the glass substrate 14 on the back side of the liquid crystal element constructs an opposite substrate. The opposite electrode 17 made of a transparent conductive film such as ITO or the like is formed substantially over the entire that surface of the glass substrate 14 which is opposed to the pixel electrodes 16. The selectively reflective layer 18 provided between the glass substrate 14 and the opposite electrode 17 is like a polymerized film of cholesteric liquid crystal and functions as a half-transmissive reflective layer.

With respect to the opposite electrode 17, film formation and patterning should preferably be carried out simultaneously by an ordinary mask spattering method. In this case, the process load to the cholesteric liquid crystal layer 60 can be extremely reduced when forming the opposite electrode 17.

Orientation films, not shown, are respectively formed on the surfaces of the array substrate 13 and the opposite substrate 14 that contact the liquid crystal layer 15. These orientation films have respective orientation directions in which liquid crystal molecules in the liquid crystal layer 15 are oriented to be perpendicular to the substrates. In this manner, a large number of liquid crystal pixels arranged in a matrix are formed between the array and opposite substrates 13 and 14.

The array substrate 13 and the opposite substrate 14 are adhered to each other by a sealing material applied along the peripheral edge parts 42 (seal parts) of both substrates. At this time, if the sealing material 43 is applied to the selectively reflective layer 18 of the opposite substrate 14, adhesion of the sealing material is so weak that reliability may be lowered and the substrates may be separated from each other in a long time use longer than ten thousand hours. Alternatively, the problem of unreliability can be avoided if an overcoat agent having excellent adhesion to the sealing material is applied onto the selectively reflective layer 18 and if the sealing material is applied to the selectively reflective layer 18 through the overcoat agent. Acrylic resins which are used for an ordinary color film may be used as the overcoat agent.

The back light source 21 arranged on the back side of the glass substrate 14 comprises a light-guide member 22 formed of a plate with a light transmittance such as acrylic or the like, a linear light source 24 provided on the side surface of the light guide member, and a diffusive reflective layer 23 provided on the back surface of the light-guide member.

In the present embodiment, TFTs using a-Si are provided as switching elements for driving liquid crystals. The switching elements, however, are not limited thereto. Two-terminal elements, such as MIMs or elements using P—Si, may be used as the switching elements. In addition, the electrodes are not limited to an active matrix but may be formed as a simple matrix.

Next, a more detailed structure of the liquid crystal display element mentioned above will now be explained together with its operation principle.

Figure 5:
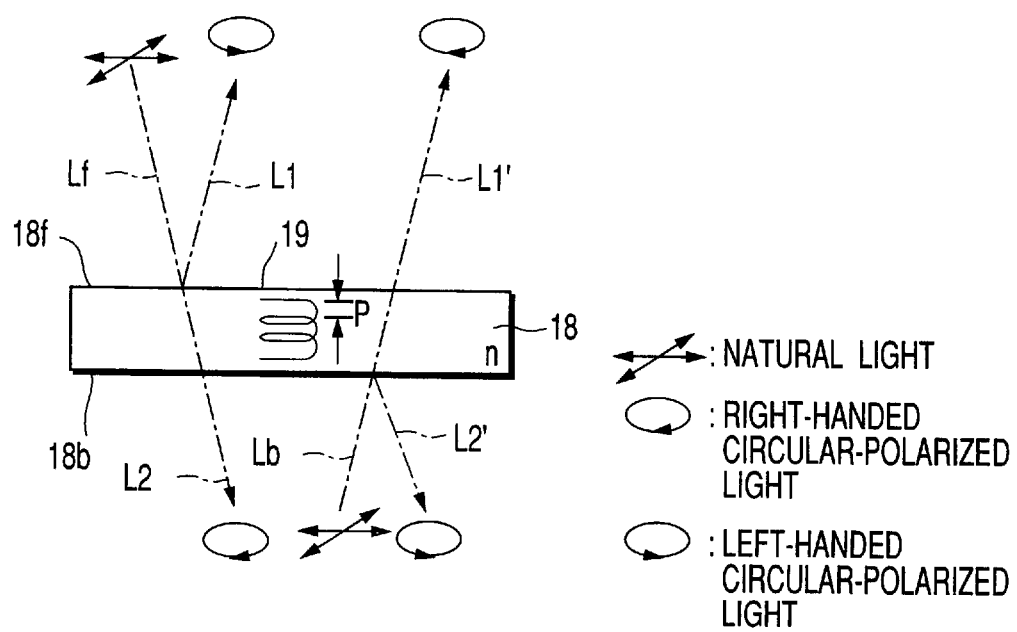
FIG. 5 is a view schematically showing the operation principle of a selectively reflective layer in the liquid crystal display element.

As shown in FIG. 5, the selectively reflective layer 18 functions to reflect only one of the left-handed and right-handed circular polarization components of the incident light that reach one main surface 18f of the layer 18, and transmits the other of the components, which revolves in the opposite direction. The layer 18 also functions to reflect only one of the left-handed and right-handed circular polarization components of the incident light that reach another main surface 18b on the opposite side, and transmits the other of the right-handed and left-handed circular polarization components. Viewed from the main surface 18f, the rotating direction of the reflected light emitted in the main surface side and that of the transmitted light in the back surface side are equal to each other, and the rotating direction of the transmitted light emitted in the back surface side and that of the reflected light are also equal to each other. FIG. 5 shows a state in which the rotating directions of the circular-polarized lights L1, L2, L1', and L2' are all observed from the side of the main surface 18f of the selectively reflective layer 18.

With respect to the cholesteric liquid crystal forming the selectively reflective layer 18, it is supposed that the np value, which is obtained by multiplying the spiral pitch p of liquid crystal molecules 19 by an average refraction factor n, is equal to the wavelength λ of the incident light. If the liquid crystal molecules have a left-handed spiral structure viewed from the observer side, light of the left-handed circular polarization component of external light which enters from the main surface side is selectively reflected by the main surface 18f, and the other remaining polarization component is transmitted to the side of the main surface 18b.

The cholesteric liquid crystal ideally has a function of reflecting 100% of the circular polarization component in the direction (left-handed or right-handed) equal to the spiral direction (left-handed or right-handed), if the np value is equal to the wavelength λ of the incident light. However, the cholesteric liquid crystal actually transmits only 10% thereof. In addition, the selectively reflective layer 18 selectively reflects the left-handed circular polarization component of light Lb which enters from the other main surface 18b.

In the liquid crystal display element comprising this kind of selectively reflective layer 18, as shown in FIG. 1, nematic liquid crystal molecules are set in homogeneous orientation in which the molecules are oriented in a direction parallel to the substrates from the array substrate 13 toward the orientation substrate 14, in an ON-state in which the liquid crystal layer 15 of the vertical orientation type is applied with a voltage from the power source 20, or more correctly, in a state in which the layer is applied with a voltage which is equal to or higher than the threshold value of the liquid crystal (Von state).

In this state, the light Lf which enters from the observer side at the upper part of the figure passes through the polarization plate 11 and the λ/4 phase difference plate 12 as a fixed retarder layer, and enters as right-handed circular-polarized light into the liquid crystal layer 15 as a variable retarder layer. Further, the phase of the light is delayed by λ/2 and is thereby converted into left-handed circular-polarized light. The light thus reaches the selectively reflective layer 18. Therefore, as described above, the selectively reflective layer 18 reflects the left-handed circular-polarized light, which has thus reached the layer 18. Its phase is delayed again by λ/2 by the liquid crystal layer 15, and the light is converted into right-handed circular-polarized light. The light is then outputted to the observer side. This light passes again through the λ/4 phase difference plate 12 to become linearly polarized light along the polarization axis of the polarization plate 11, and is then outputted to the outside, passing through the polarization plate 11. In this manner, display in an open state is attained.

Figure 6:
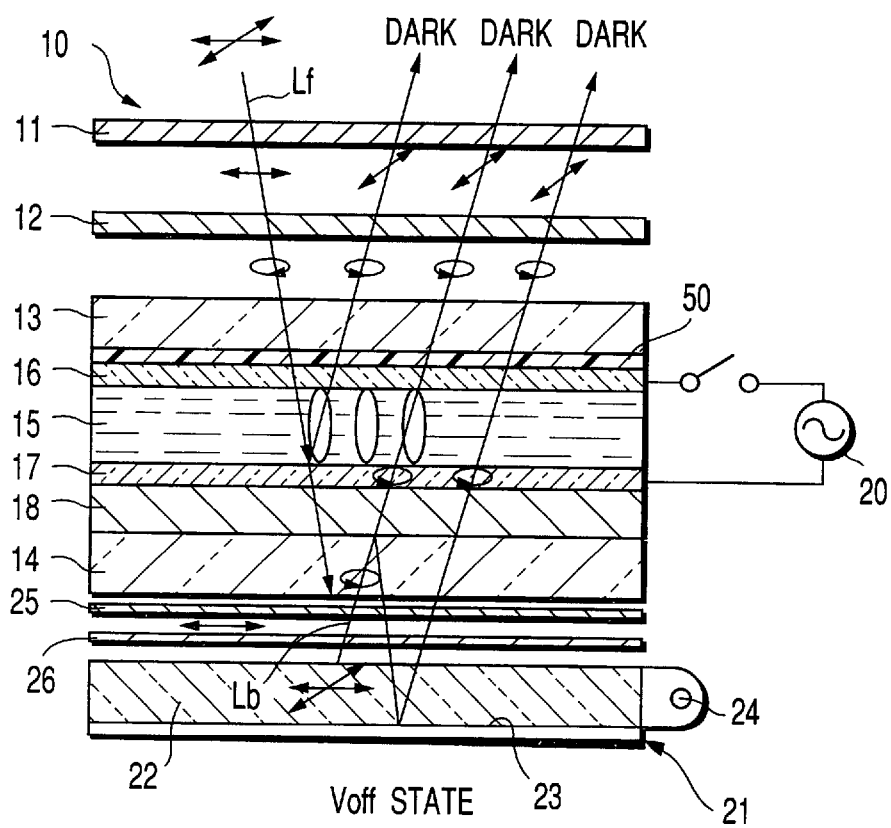
FIG. 6 is a view showing the liquid crystal display element in a state wherein a second voltage from the power source is applied to the liquid crystal of the element.

Also, as shown in FIG. 6, liquid crystal molecules of the liquid crystal layer 15 are arranged to be vertical to the glass substrates 13 and 14, so that the incident light is not subjected to phase modulation, in an OFF-state in which the liquid crystal layer 15 is applied with a voltage equal to or lower than the threshold value (including zero voltage) (Voff state).

In this state, the light which enters from the upper side in the figure passes through the polarization plate 11 and the λ/4 phase difference plate 12 and enters as right-handed circular-polarized light into the liquid crystal layer 15. Its phase, however, is not modulated by the liquid crystal layer 15 but reaches the selectively reflective layer 18, as unchanged right-handed circular-polarized light. Therefore, the right-handed circular-polarized light penetrates through the selectively reflective layer 18 toward the back side, and is converted into linearly polarized light having a vibration component along the absorption axis of the polarization plate 26. As a result of this, the incident light Lf does not return to the observation surface and display of a dark state can be obtained.

Next explanation will be made of the operation where the back light source 21 provided on the back side of the selectively reflective layer 18 is operated.

During the Von period shown in FIG. 1, the light Lb outputted from the surface light source 21 becomes left-handed circular-polarized light by means of the polarization plate 26 and the phase difference plate 25. Light at a predetermined rate of the left-handed circular-polarized light is transmitted through the selectively reflective layer 18, and the other remaining portion of light is reflected by the selectively reflective layer. The light transmitted through the selectively reflective layer 18 is subjected to phase modulation by the liquid crystal layer 15, and is converted into left-handed circular-polarized light. Further, this light passes through the λ/4 phase difference plate 12 and is thereby changed into linearly polarized light along the polarization axis of the polarization plate 11. The light then passes through the polarization plate and is outputted to the side of the observation surface. In this manner, display of a bright state is obtained.

Meanwhile, during the Voff period shown in FIG. 6, the left-handed circular-polarized light, which has passed through the selectively reflective layer 18, is directly outputted to the observation side without phase modulation by the liquid crystal layer 15. Further, this light passes through the λ/4 phase difference plate 12 thereby to become linearly polarized light having a vibration direction perpendicular to the polarization axis of the polarization plate 11, and is then absorbed by the polarization plate 11. In this manner, display of a dark state is obtained.

In the liquid crystal display element which operates as described above, the value np, which is obtained by multiplying the spiral pitch p of the cholesteric liquid crystal layer forming the selectively reflective layer 18 by an average diffraction factor n of the cholesteric liquid crystal polymer, is set such that the spiral pitch p changes along the film thickness direction of the cholesteric liquid crystal layer and selectively reflects the left-handed circular-polarized light, according to the present embodiment.

However, the selectively reflective layer 18 has a spiral structure which transmits a part of left-handed circular-polarized light, with respect to the light within a wavelength range near the three main wavelengths of the output light spectrum from the back light source 21. The three main wavelengths of the light emitted from the back light source 21 have respective intensity peaks near 430 nm, 550 nm, and 610 nm. Further, the selectively reflective layer 18 transmits light of three small wavelength ranges which cover respective widths (hereinafter called slit widths) of 20 to 30 nm from the centers of the three main wavelengths.

Figure 7:
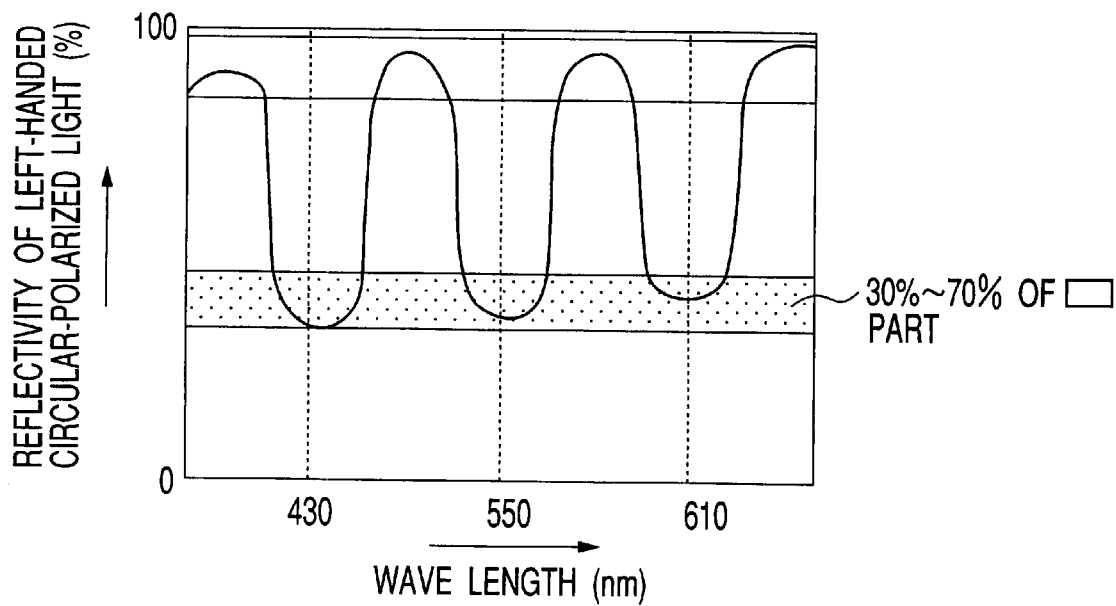
FIG. 7 is a graph showing the reflection characteristic of the selectively reflective layer in the liquid crystal display element.

FIG. 7 shows a schematic view of wavelength dispersion of the reflection factor to the left-handed circular polarization component. In order to obtain a cholesteric liquid crystal layer whose spiral pitch changes along the layer thickness direction, it is preferable to adopt a method of layering plural kinds of cholesteric liquid crystal polymer layers respectively having different pitches, or a method of coating an additive agent which elongates the spiral pitch of the cholesteric liquid crystal, such as nematic liquid crystal or the like having an infinite spiral pitch, on the film surface after applying cholesteric liquid crystal material, when cholesteric liquid crystal material is applied to a substrate and hardened.

The rate, at which the selectively reflective layer 18 transmits the left-handed circular polarization component of the light within the wavelength ranges near the three main wavelengths of the output light spectrum from the back light source 21, can be changed by the environmental illumination state in which the liquid crystal display element is used.

The present inventors investigated luminance and wavelength dispersion in various environments. Display performances of a liquid crystal display element in respective environments were simulated, in consideration of the light intensity of the back light source and the wavelength dispersion of the reflection factor of the selectively reflective layer. As a result, it has been found that the reflection factor of the selectively reflective layer 18 to light falling within wavelength ranges near the three main wavelengths should be most optimally set to 30 to 70% of the reflection factor with respect to light within the other wavelength ranges in a liquid crystal display element which is used indoors and outdoors.

In this manner, external light and light from the back light source can be utilized in an excellent balance, over the entire wavelength range of visible light, so that a liquid crystal display device can be attained with very high use efficiency in response to a variety of environments. Based on this, wavelength dispersion of the left-handed circular polarization component reflection factor of the selectively reflective layer 18 should preferably be as shown in FIG. 7.

Next an explanation will be made of a liquid crystal display element according to the second embodiment of the present invention.

Figure 8:
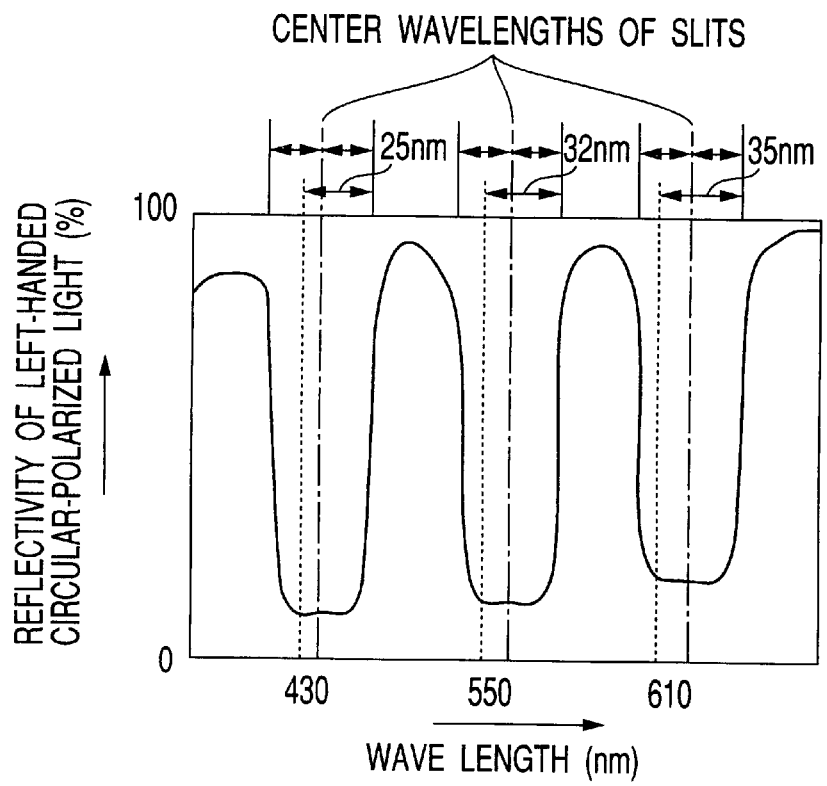
FIG. 8 is a graph showing the reflection characteristic of a selectively reflective layer in a liquid crystal display element according to the second embodiment of the present invention.

In the second embodiment, wavelength dispersion of the left-handed circular polarization reflective layer 18 will be as shown in FIG. 8. That is, the slit widths near the main three wavelengths of the back light source 21 have centers that are deviated to the side of longer wavelengths from the centers of the three main wavelengths. The other points of the structure are the same as those of the first embodiment, and a detailed explanation thereof will be omitted herefrom.

In general, in the selectively reflective layer 18 using cholesteric liquid crystal, it is known that the wavelength of selected reflection shifts to the side of a shorter wavelength, when it is viewed obliquely than when it is viewed from the front side. If it is observed from an oblique direction at an angle θ, the shift amount Δλ is given by the following expression.

$$\Delta\lambda = np(1-\cos\theta) \quad (1)$$

Therefore, in the case where this kind of selectively reflective layer 18 is used for a liquid crystal display element, the display characteristics vary between when it is observed from the front side and when it is observed obliquely. If the reflection characteristic of the selectively reflective layer 18 has previously been shifted to the side of a longer wavelength, advantages can be attained in the case where the display element is frequently observed obliquely.

For example, the shift of a selected reflection wavelength can be calculated by using Snell's law, when a liquid crystal display element is observed at an angle of 30° to its main surface in the case where the three main wavelengths are 430, 550, and 610 nm. Snell's low is given as follows.

$$n \cdot \sin\theta = n' \cdot \sin\theta' \quad (2)$$

In this expression, n and n' are refraction factors of the liquid crystal layer 15 and air, and θ' denotes the direction in which the liquid crystal display element is observed. θ denotes an estimated angle to the selectively reflective layer 18 when the liquid crystal display element is observed from the direction θ'. From the expressions (1) and (2), the corresponding wavelengths of the selected reflection layer 18 are respectively shifted by 24.6 nm, 31.5 nm, and 34.9 nm to the side of shorter wavelengths.

Hence, in the case where the reflection characteristic of the selectively reflective layer 18 is set as shown in FIG. 8 as defined in the present embodiment, the three main wavelengths can sufficiently be covered and used for display even when the slits corresponding to the three main wavelengths of the surface light source 21 are shifted while the liquid crystal display element is observed at a direction of 30° to the front surface. In case where the direction of observation is larger than 30°, the shift amounts may be increased. Alternatively, in the case where the direction of observation is smaller than 30°, the shift amounts may be decreased.

Thus, according to the second embodiment, it is possible to provide a liquid crystal display element which causes less display change whether it is observed from the front side or obliquely. In order to attain the advantage of the present embodiment, the slit widths provided near the three main wavelengths may be increased to 30 to 80 nm. In this manner, it is possible to provide a half-transmissive liquid crystal display element capable of greatly improving the light use efficiency and realizing excellent display over a wide range of view angles.

Figure 9:
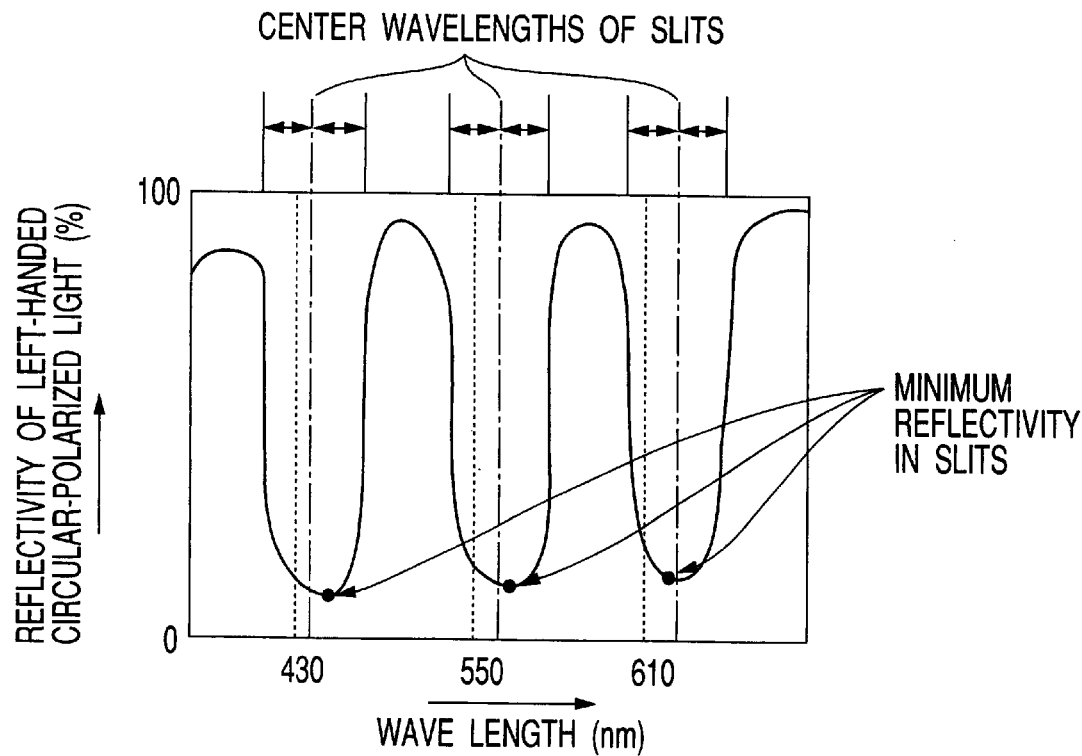
FIG. 9 is a graph showing the reflection characteristic in case where the liquid crystal display element adopts a selectively reflective layer having a different reflection characteristic.

In addition, as shown in FIG. 9, the wavelengths that provide minimum reflection factors within the slit widths can be set to be equal to or higher than the three main wavelengths. In this case, it is possible to reduce the reduction of the use efficiency of the back light source, which is caused by shifts of the slits to the side of shorter wavelengths when the liquid crystal display element is viewed obliquely.

Figure 10:
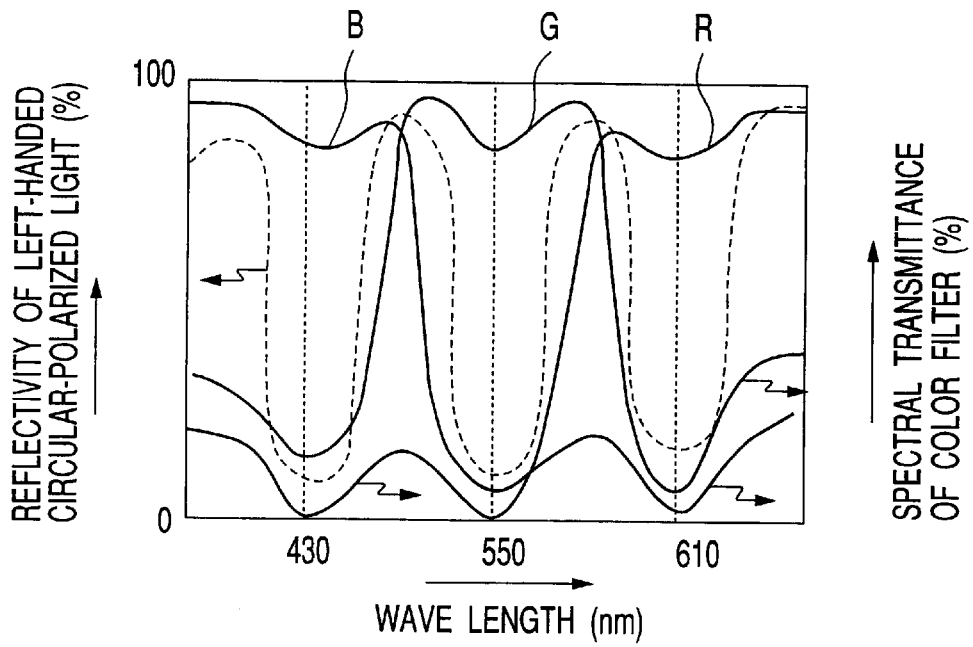
FIG. 10 is a view showing a reflection characteristic of a selectively reflective layer of a liquid crystal display element according the third embodiment of the present invention and a spectral transmission factor of a color filter thereof.

Next an explanation will be made of a liquid crystal display element according to the third embodiment of the present invention. The third embodiment has substantially the same structure as those of the first and second embodiments described previously. However, the color filter layer 50 of the present embodiment has a different polarization characteristic. FIG. 10 shows the reflection characteristic of the selectively reflective layer 18 used in the third embodiment and polarization transmission rates of the color filter layer corresponding to red (R), green (G), and blue (B).

As shown in FIG. 10, within a wavelength range in which the reflection factor of the selectively reflective layer 18 is low, the transmission rate of the color filter layer 50 is set to be lower than the wavelength ranges in both sides in which the reflection factor of the color filter is high. Setting of the polarization transmission rates need not be performed on all of "the wavelength range in which the reflection factor is low".

According to the third embodiment of the present invention comprising the color filter layer 50 constructed as described above, display is achieved mainly by using reflection of external light, within a wavelength range in which the reflection factor of the selectively reflective layer 18 is high. In this case, the external light passes through the color filter layer 50 two times, i.e., when the external light enters into the liquid crystal display element and when it is emitted as reflection light. Meanwhile, display is achieved mainly by using transmitted light from the back light source, within a wavelength range in which the reflection factor of the selectively reflective layer 18 is low. In this case, light passes through the color filter layer only once. Therefore, to balance the color density better between a wavelength using mainly reflection and a wavelength range mainly using transmission, it is preferable to change the transmission rates of the color filter layer 50 corresponding to R, G, and B.

It is hence possible to provide a liquid crystal display element capable of realizing a wider color reproduction range and a much better color display, by using the color filter layer 50 having the polarization characteristic shown in FIG. 10.

Although the third embodiment uses a color filter layer 50 based on an additive mixture of color stimuli of R, G, and B, a design having a similar polarization characteristic can be adopted even when a color filter layer based on a subtractive color mixture of Y, C, and M is used.

In addition, the transmission factor of the color filter within a wavelength range in which the reflection factor is low should preferably be about $T^2$ (<T), where T is a transmission factor of the color filter within a wavelength range in which the reflection factor of the selectively reflective layer is high. However, the transmission factor may be higher than $T^2$. That is, it is possible to attain a sufficient effect equivalent to the difference provided between the transmission factors of the color filter layer.

Furthermore, the present invention is not limited to the embodiments described above but may be variously modified within the scope of the invention. For example, the three main wavelengths of the output light spectrum of the back light source are set to 430 nm, 550 nm, and 610 nm, and correspondingly, the reflection factors of the selectively reflective layer 18 are set as described above, in the first, second, and third embodiments. In the case of using a back light source having different output light spectrums, however, the reflection factors of the selectively reflective layer should rather be set in correspondence with the spectrums. Although the three main wavelengths are used in the embodiments, slits may be provided by selecting one main wavelength, two main wavelengths, four main wavelengths, or more if necessary. Also in this case, similar functions and effects to those described above can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A half-transmissive liquid crystal display element comprising:
    a polarization plate having a polarization axis, for transmitting linearly polarized light along the polarization axis;
    a light modulation layer arranged behind the polarization plate, for modulating incident light having first and second circular polarization components, in correspondence with an applied voltage;
    a selectively reflective layer arranged behind the light modulation layer, for reflecting the first circular polarization component of incident light; and
    a back light source arranged behind the selectively reflective layer, for emitting light having intensity peaks at a plurality of predetermined wavelengths, respectively, toward the selectively reflective layer, wherein
    the selectively reflective layer has first reflection factors to the first polarization components of incident light falling within first small regions of visible light, including the plurality of predetermined wavelengths, and has second reflection factors to the first polarization components of incident light falling within second small regions of visible light, not including the plurality of predetermined wavelengths, the first reflection factors being set to be smaller than the second reflection factors.

2. A half-transmissive liquid crystal display element according to claim 1, wherein the first reflection factors are set to be 30 to 70% of the second reflection factors.

3. A half-transmissive liquid crystal display element according to claim 1, wherein in at least one group of the first and second reflection factors, the reflection factors are not constant.

4. A half-transmissive liquid crystal display element according to claim 1, wherein at least one of the first small regions has a center wavelength longer than a corresponding one of the predetermined wavelengths.

5. A half-transmissive liquid crystal display element according to claim 4, wherein the center wavelength of the at least one of the first small regions is longer by 0 to 40 nm than the corresponding one of the predetermined wavelengths.

6. A half-transmissive liquid crystal display element according to claim 4, wherein each of the first small regions has a band width of 30 nm to 80 nm.

7. A half-transmissive liquid crystal display element according to claim 4, wherein in at least one of the first small regions, a minimum value of the reflection factor to the first circular polarization component is equal to or longer than the corresponding one of the predetermined wavelengths.

8. A half-transmissive liquid crystal display element comprising:
    a polarization plate having a polarization axis, for transmitting linearly polarized light along the polarization axis;
    a light modulation layer arranged behind the polarization plate, for modulating incident light having first and second circular polarization components, in correspondence with an applied voltage;
    a selectively reflective layer arranged behind the light modulation layer, for reflecting the first circular polarization component of incident light;
    a back light source arranged behind the selectively reflective layer, for emitting light having intensity peaks at a plurality of predetermined wavelengths, respectively, toward the selectively reflective layer; and
    a color filter layer provided in front of the selectively reflective layer, wherein
    the selectively reflective layer has first reflection factors to the first polarization components of incident light falling within first small regions of visible light, including the plurality of predetermined wavelengths, and has second reflection factors to the first polarization components of incident light falling within second small regions of visible light, not including the plurality of predetermined wavelengths, the first reflection factors being set to be smaller than the second reflection factors, and
    the color filter layer has spectral transmission factors to incident light, the spectral transmission factor to incident light falling within at least one of the first small regions being set to be smaller than the spectral transmission factor to incident light falling within the second small regions.

* * * * *